(12) United States Patent
Gibson et al.

(10) Patent No.: US 7,930,087 B2
(45) Date of Patent: Apr. 19, 2011

(54) VEHICLE BRAKING CONTROL

(75) Inventors: Alex Gibson, Ann Arbor, MI (US); Nate Trask, Dearborn, MI (US); Dennis Reed, Dexter, MI (US); Ilya V. Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1280 days.

(21) Appl. No.: 11/465,414

(22) Filed: Aug. 17, 2006

(65) Prior Publication Data

US 2008/0041336 A1   Feb. 21, 2008

(51) Int. Cl.
  *G06F 19/00* (2011.01)
  *F01L 1/34* (2006.01)
  *F01L 9/04* (2006.01)
  *F02D 13/04* (2006.01)

(52) U.S. Cl. ..... 701/103; 123/321; 123/322; 123/90.11; 123/90.15; 123/432

(58) Field of Classification Search ................ 123/90.11, 123/90.15–90.18, 320–324, 347, 348, 432, 123/568.14; 701/101–103, 110, 115; 188/273
See application file for complete search history.

(56) References Cited

U.S. PATENT DOCUMENTS

| | | | |
|---|---|---|---|
| 3,601,106 A * | 8/1971 | Nakajima | 123/339.1 |
| 4,159,701 A * | 7/1979 | Murata | 123/324 |
| 6,009,841 A | 1/2000 | Hickey | |
| 6,439,175 B2 * | 8/2002 | Arai et al. | 123/321 |
| 6,502,543 B1 | 1/2003 | Arai et al. | |
| 6,526,745 B1 * | 3/2003 | Ogiso | 123/321 |
| 6,651,624 B2 | 11/2003 | Gaessler et al. | |
| 6,945,224 B2 * | 9/2005 | Yoshizawa et al. | 123/321 |
| 6,951,198 B1 * | 10/2005 | Megli et al. | 123/321 |
| 6,959,689 B1 * | 11/2005 | Megli et al. | 123/322 |
| 2006/0213481 A1 * | 9/2006 | Hanson et al. | 123/90.11 |
| 2007/0113803 A1 * | 5/2007 | Froloff et al. | 123/90.11 |

FOREIGN PATENT DOCUMENTS

| | | |
|---|---|---|
| EP | 1143116 | 10/2001 |
| FR | 2818693 A1 * | 6/2002 |

* cited by examiner

*Primary Examiner* — Willis R Wolfe, Jr.
(74) *Attorney, Agent, or Firm* — Allan J. Lippa; Alleman Hall McCoy Russell & Tuttle LLP (57) ABSTRACT

A method of operating an engine for a vehicle having at least a first cylinder, the method comprising of operating the first cylinder to provide at least one of compression braking and expansion braking by holding one of an intake valve and an exhaust valve of the first cylinder closed while opening, closing, and opening the other of the intake valve and the exhaust valve during a cycle of the first cylinder and during a first vacuum level of an intake manifold upstream of the first cylinder; and operating the first cylinder to provide at least one of compression braking and expansion braking by operating both the intake valve and the exhaust valve of the first cylinder during a cycle of the first cylinder to allow at least some air to flow through the first cylinder during a second vacuum level of the intake manifold.

20 Claims, 6 Drawing Sheets

FIG. 6B ns and
methods for controlling vehicle operation including during

VEHICLE BRAKING CONTROL

BACKGROUND AND SUMMARY

Some vehicles may include engines that are configured to shut-off the fueling and the ignition system of one or more of the cylinders during deceleration events also known as deceleration fuel shut-off (DFSO) in an effort to achieve improved fuel economy and reduced emissions. During these DFSO events, intake air not participating in combustion, may pass through the engine via one or more deactivated cylinders where it may reduce the effectiveness of a downstream exhaust catalyst via catalyst cooling and/or oxidant saturation.

In one approach, an engine including intake and exhaust valves having electric valve actuation may close the intake valves of the deactivated cylinders to reduce airflow through the engine while the exhaust valves are controlled to modulate torque output. Similarly, engines having exhaust valves that are cam actuated may utilize a deactivation device for closing a sub-set of the exhaust valves. For example, the exhaust valves of one of the two cylinder banks of an eight cylinder engine may be closed during a DFSO event to reduce airflow through the engine.

However, the inventors have recognized a disadvantage with this approach. Specifically, during some DFSO events, the intake manifold may not have a sufficient vacuum level to operate other vehicle systems such as the vehicle's brakes.

In one approach, the above issues may be addressed by a method of operating an engine for a vehicle having at least a first cylinder, the method comprising operating the first cylinder to provide at least one of compression braking and expansion braking by holding one of an intake valve and an exhaust valve of the first cylinder closed while opening, closing, and opening the other of the intake valve and the exhaust valve during a cycle of the first cylinder and during a first vacuum level of an intake manifold upstream of the first cylinder; and operating the first cylinder to provide at least one of compression braking and expansion braking by operating both the intake valve and the exhaust valve of the first cylinder during a cycle of the first cylinder to allow at least some air to flow through the first cylinder during a second vacuum level of the intake manifold.

In this way, deceleration control may be achieved while reducing oxygen to the exhaust and providing sufficient intake manifold vacuum by adjusting valve operation depending on vacuum conditions. Further, in some conditions, operation of an intake throttle may be coordinated with valve operation to provide increased intake manifold vacuum while providing the desired braking of the vehicle.

DETAILED DESCRIPTION

The present application describes various systems and methods for controlling vehicle operation including during deceleration conditions. In one particular example, the system provides engine cylinder expansion and/or compression braking in one or more cylinders to vary a level of engine braking during deceleration conditions and thereby improve vehicle response. Further, alternative valve opening timing, closing timing, and phase control are provided in response to varying vacuum levels and vacuum requests in the intake manifold, while also reducing flow of air through the engine to the exhaust.

Figure 1:
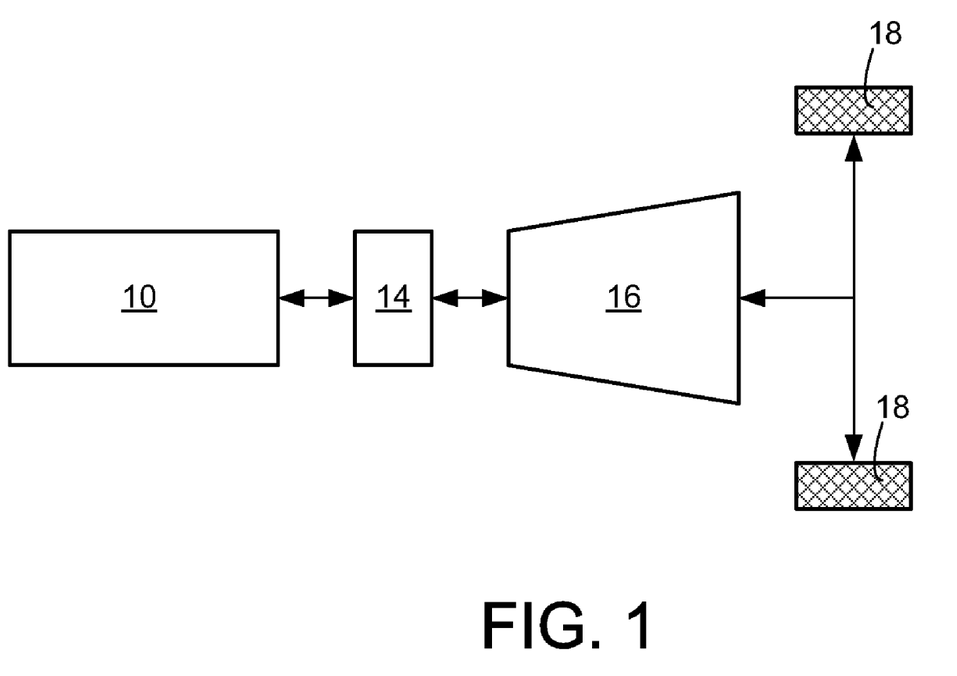
FIG. 1 schematically shows an example vehicle powertrain.

FIG. 1 schematically shows an example vehicle powertrain 20 including an internal combustion engine 10, a torque converter 14, a transmission 16 and one or more wheels 18 for transmitting propulsive force to the ground surface. In this example, torque may be selectively transmitted from the engine to one or more drive wheels via the torque converter and transmission. Similarly, torque may be selectively transmitted from one or more of the drive wheels to the transmission and/or engine via the torque converter.

Figure 2:
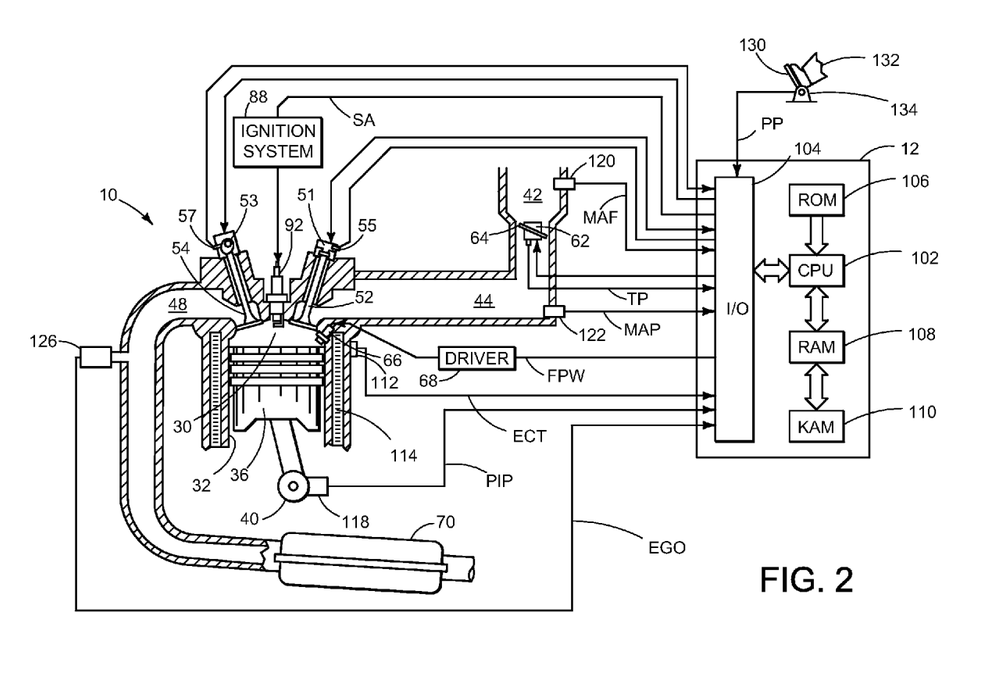
FIG. 2 schematically shows an example engine.

FIG. 2 schematically shows engine 10 as may be used in the configuration shown in FIG. 1. Specifically, FIG. 2 shows one cylinder of multi-cylinder engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel (e.g. drive wheel 18) of the passenger vehicle via torque converter 14 and transmission system 16. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. During some conditions, controller 12 may vary the signals provided to actuator 51 to control the opening and closing of intake valve 52. The position of intake valve 52 may be determined by controller 12 via valve position sensor 55. Exhaust valve 54 may be controlled by cam actuation via cam actuation system 53. Cam actuation system 53 may include one or more cams and may utilize one or more of cam profile switching (CPS), variable cam timing (VCT), variable valve timing (VVT) and/or variable valve lift (VVL) systems that may be operated by controller 12 to vary valve operation. Further, cam actuation system 53 may include a valve deactivation device that causes exhaust valve 54 to be held closed, thereby inhibiting air to flow through cylinder 30. In some embodiments pushrods or rods may be used to actuate rocker arms above the cylinder head to actuate the valves. In some examples, these pushrods may be controlled to vary in length (e.g. by a hydraulically actuated lost motion device), which can also be used to activate/deactivate intake and/or exhaust valves. The position of exhaust valve 54 may be determined by controller 12 via position sensor 57. In alternative embodiments, exhaust valve 54 may be controlled by electric valve actuation as described with reference to intake valve 52 and/or intake valve 52 may be controlled by cam actuation as described with reference to exhaust valve 54.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in the intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Further, controller 12 can provide control signals to torque converter 14 and/or transmission 16 shown in FIG. 1. For example, the state of the torque converter can be varied by the control system between a locked, unlocked, or partially locked states and the transmission may be controlled to vary the gear ratio provided between the torque converter and the drive wheels.

In some conditions, such as where deceleration of the vehicle is desired, controller 12 may selectively deactivate fueling and/or ignition provided to the cylinder in what may be referred to as a deceleration fuel shut-off (DFSO) mode. Further, the control system may vary the number of cylinders that are operated in the DFSO mode. As described herein, a cylinder operating in a DFSO mode may also be referred to a deactivated cylinder.

As described above, FIG. 2 shows only one cylinder of a multi-cylinder engine, and that each cylinder may similarly include one or more intake/exhaust valves, a fuel injector, a spark plug, etc.

Figure 3:
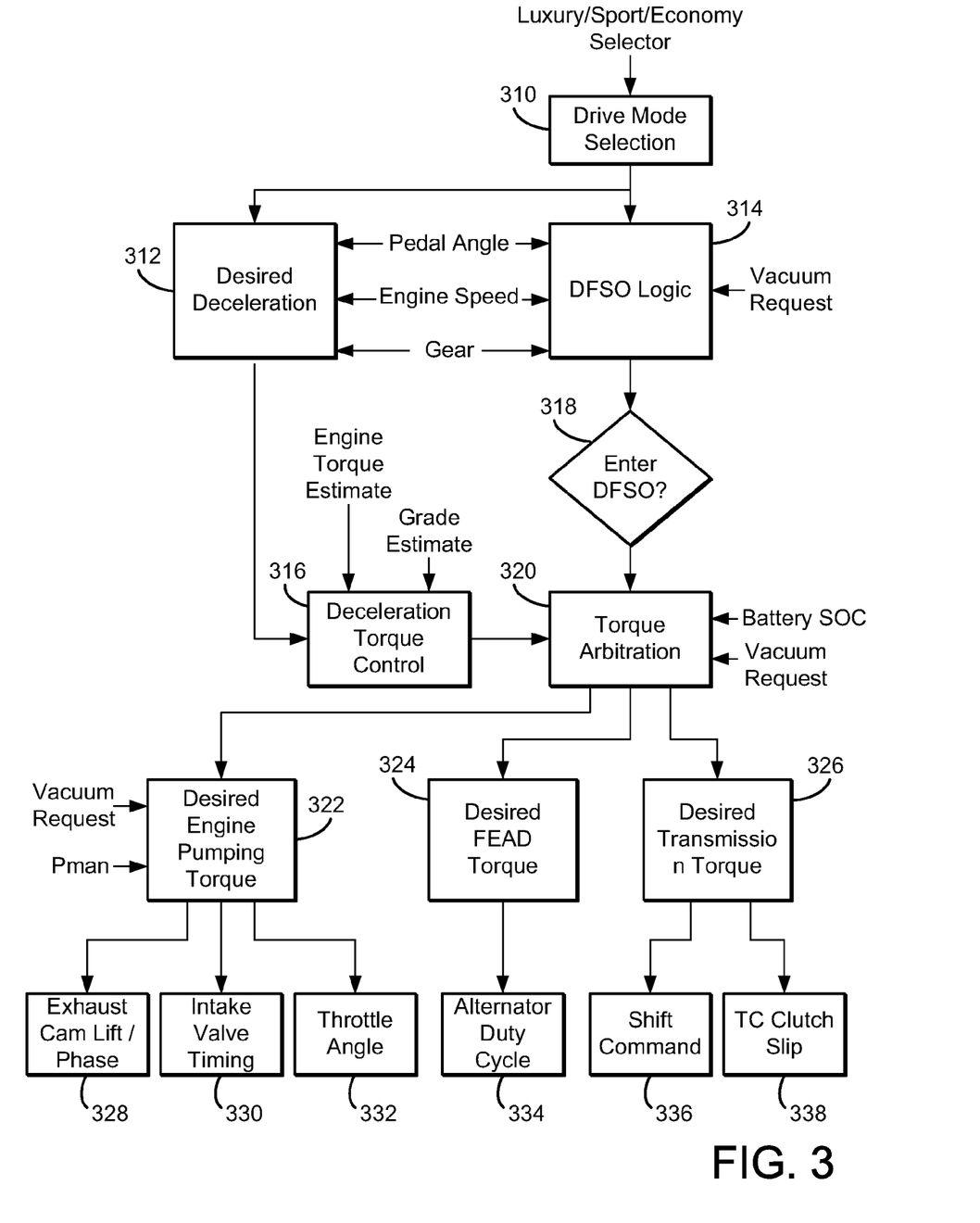
FIG. 3 shows an example deceleration fuel shut-off (DFSO) routine integrating control of intake valve opening and closing timing, exhaust cam lift and phase, alternator charging/discharging, torque converter slip control, and transmission shifting.

Referring now to FIG. 3, a high level block diagram of engine and transmission control that may be used during various conditions, such as during vehicle deceleration, is described. In particular, the system utilizes engine valve timing and/or lift adjustments, transmission adjustments, throttle adjustments, and various other operations to control a level of engine braking during vehicle deceleration (which may include fuel injector deactivation conditions). In particular, engine valve adjustments are used during deceleration or other conditions to adjust a level of engine braking torque while also decreasing flow through the exhaust system.

Note that various engine configurations may be used, along with a number of methodologies for controlling engine braking torque.

As a first example, each of the intake valves of the deactivated cylinders may be held closed (e.g. via EVA) to reduce the transfer of fresh air from the intake manifold to the exhaust manifold while the exhaust valves are operated in one or more different modes. During a first mode, the exhaust valves may be operated to generate pumping loss torque via at least one of expansion and compression braking (i.e. by opening, closing, and opening at least one exhaust valve per cylinder). During a second mode, each of the exhaust valves of the deactivated cylinders may be held closed (e.g. via a valve deactivation device) so that the air trapped within the cylinder acts as a spring and reduces the pumping loss torque. During a third mode, one or more exhaust valves of each of the deactivated cylinders may switch between the first and second modes described above to pulse width modulate (PWM) the pumping loss torque (i.e. braking) to achieve a desired average torque that is a function of the period of the closed exhaust valves. For example, the exhaust cam phase device may modulate the pumping/braking loss of the deactivated cylinders with functioning (e.g. non-deactivated) exhaust valves. As another example, the exhaust valve deactivation device and the cam phase device may be combined to provide PWM and modulate the pumping/braking torque of the deactivated cylinders.

As a second example, each of the exhaust valves on one or more of the deactivated cylinders may be held closed to reduce air flow between the intake and exhaust manifolds while the intake valves are operated in one or more different modes. If the exhaust valves are cam actuated and include a valve deactivation device, the valve deactivation device may be operated to deactivate the exhaust valves of one or more of the deactivated cylinders. For example, with an eight cylinder engine, a first bank of four cylinders may be deactivated by discontinuing fueling and ignition and each of the exhaust valves of the deactivated cylinders may be deactivated while one or more of the intake valves of the deactivated cylinders are operated via electric valve actuation to modulate the pumping loss torque as desired. For example, if less braking is desired, one or more intake valves may be held closed to utilize air trapped in one or more of the deactivated cylinders as a spring. Alternatively, if a greater level of braking is desired, one or more of the intake valves of one or more of the deactivated cylinders may be operated to perform expansion and/or compression braking. In other words, if greater braking is desired, the number of cylinders performing a braking operation may be increased by varying the timing of one or more intake valves. Similarly, if less braking is desired, the number of cylinders performing a braking operation may be reduced by varying the timing of one or more intake valves.

As a third example, at least one intake valve and at least one exhaust valve may be operated on each of one or more deactivated cylinders using one of the following modes. During a first mode, the intake manifold pressure may be controlled by the throttle with or without intake manifold pressure feedback, to control the pumping loss/braking torque of the deactivated cylinders. The intake valve timing and the exhaust cam phase device may be modulated to improve the resolution and range of the pumping loss/braking torque.

As a fourth example, the control system may use an exhaust catalyst oxygen storage strategy that determines the oxygen storage state of the catalyst due to the transfer of fresh air from the intake manifold to the exhaust via the deactivated cylinders. The control system may calculate the amount of "rich burst" fuel required to re-initialize the catalysts at the end of a DFSO event and initiates and controls the post DFSO "rich burst" fuel delivered to maintain catalyst efficiency.

As a fifth example, during a DFSO operation utilizing a braking function of one or more cylinders, where an increase in intake manifold pressure is desired, operation of the intake valves and/or exhaust valves may be varied to increase the air flow through the deactivated cylinders. Further, the throttle may be controlled (e.g. to decrease the effective flow area) to further restrict the air flow into the intake manifold. In this manner, the intake manifold vacuum level may be increased.

Selection from the above examples and/or modes can be performed in various ways, one of which is illustrated in FIG. 3. During a deceleration event, the wheel torque can be varied (positive and/or negative) to adjust the vehicle deceleration rate by first performing drive mode selection in 310 in which the driver may select a vehicle performance mode, or the mode may be determined from calibration tables, which may be a sport mode, a luxury mode, a fuel economy mode, or other mode. The drive mode selection may then be used in determining a desired deceleration rate based on vehicle gear, the selected mode, pedal position (e.g. angle), engine speed, vehicle speed, transmission gear and/or other parameters in 312. These parameters, along with others such as an intake manifold vacuum level request, may also be used to select whether deceleration fuel shut-off (DFSO) is performed at 314, in which fuel injection of one or more cylinders may be deactivated while piston and/or valve motion continues. Once the DFSO logic selects DFSO operation in 318, this determination is provided to the torque arbitration logic of 320.

Continuing with FIG. 3, from the desired deceleration rate, along with road grade and engine torque, a desired wheel torque level can be selected in 316 via the deceleration torque control. The desired wheel torque may also be provided to the torque arbitration of 320, along with the battery state of charge and/or the vacuum level request, which are used to determine the desired engine braking torque level (via negative engine torque, such as pumping and/or compression braking) in 322, the desired accessory torque (FEAD) in 324, and the desired transmission torque in 326. In one example, from the desired wheel torque, the torque arbitration logic determines the desired total engine torque which is a function of the FEAD and engine torques, (which may be the torque contribution from the smart alternator and/or AC compressor) and the engine while in DFSO mode, and the desired transmission output torque required to meet the desired wheel torque for a given engine torque output. The torque arbitration algorithm may further use the battery state of charge estimate to determine the potential instantaneous negative torque potential of the smart alternator. If the desired transmission output torque can not be met in the current gear, with the potential engine and FEAD torque, then the torque arbitration algorithm commands the transmission to shift to a gear that can support the desired transmission output torque. Specifically, from the desired engine torque level of 322, exhaust valve timing and/or lift and/or phase angle may be adjusted in 328, intake valve opening and/or closing timing may be adjusted in 330, and throttle angle may be adjusted in 332. Further, from the desired FEAD torque in 324, the alternator duty cycle may be adjusted in 334. Finally, form the desired transmission torque in 326, the gear shifting may be adjusted in 336 and the torque converter lock-up duty cycle may be adjusted in 338.

On a road with zero or positive grade, the torque arbitration algorithm may command the engine and transmission output torque that delivers a specified fuel economy, for the given drive mode. Under these conditions reduced fuel consumption may be achieved by remaining in DFSO by minimizing the engine/driveline braking torque while in DFSO and by minimizing the slip across the torque converter clutch, for an automatic transmission, or closing the clutch, for a manual transmission. Under these conditions the engine torque can be reduced by closing both the intake and exhaust valves (e.g., by using the EVA intake valve actuators and the exhaust CAM lift actuators to close all of the valves). In the example where the exhaust cam lift actuator is not capable of closing all of the exhaust valves, then the engine braking torque can be reduced by closing those exhaust valves that can be closed and either holding open the exhaust valves or operating the exhaust valves with the maximum cam lift and using the cam phase control to adjust the exhaust cam phase, on the operating exhaust valves, for reduced braking torque if desired.

On a road with a negative grade it may be desirable to operate the engine with a higher braking torque to achieve the desired wheel torque. Further with a negative road grade, increasing the engine braking torque may allow the driver to maintain a desired vehicle speed without resorting to applying the brake. For example, the engine braking torque can be controlled while in the DFSO mode by controlling the timing on the EVA intake valves and by controlling the lift and/or phase of the exhaust valves using a cam lift and/or phase control device. Further the transmission output torque can be further controlled by changing the gear to increase or decrease the wheel torque and by controlling the slip across the torque converter lock-up clutch.

Some of the above engine braking torque generation approaches may result in intake manifold pressure rising to atmospheric pressure. For example, when operating all cylinders to hold intake valves closed during a cycle and opening and closing the exhaust valves at appropriate positions to generate engine braking torque via compression and/or expansion braking, the intake pressure may reach substantially atmospheric pressure. Further, various systems may periodically require increased intake manifold vacuum levels, such as brake booster or canister purge systems, or other vacuum actuated devices in the vehicle, or an NVH derived vacuum request.

In one embodiment, if the intake valves are closed during the DFSO event and the vacuum request indicates increased vacuum levels are requested, then the intake and/or exhaust valve timing on one or more cylinders may be adjusted to allow air flow through the engine and the throttle may then be controlled to achieve the desired intake manifold vacuum. Once the vacuum request is satisfied, the intake and/or exhaust valve operation may be returned to reduce flow through the engine while again still providing the desired level of engine braking. In this way, it is possible to continue to provide the desired level of engine braking (e.g., via compression and/or expansion braking of one or more cylinders), while still providing desired vacuum when requested. Further, flow through the engine may still be held to relatively low levels, thus providing improved catalyst performance with respect to combustion gasses.

While the above example illustrates how intake manifold pressure may rise to near atmospheric pressure when all cylinders are operated in a particular way, this is just one example to illustrate the effects of particular engine braking strategies. The examples may be extended to situations where one (1), or only a subset of engine cylinders operate in a specified way that increases manifold pressure (or decreases manifold vacuum). As such, adjustments to valves in only one, or a subset of cylinders, may be provided in response to intake vacuum requests. Additional details of an example approach for varying intake manifold vacuum during engine deceleration operation is provided in FIG. 4.

Note that if some air is allowed to flow through the engine during a DFSO event, for example, to satisfy a vacuum request, then it may be desirable to estimate the catalyst state with the use of a catalyst oxygen storage estimator and then to use the output of this estimator at the end of the DFSO event to determine the amount of the additional fuel to be applied post DFSO to re-initialize the catalytic converter.

While the above operation is one example of control carried out by the routine of FIG. 3, various other modifications or additions are also possible. For example, adjustments may be performed when transitioning into and/or out of engine compression and/or expansion braking (with or without flow through the engine). In one particular example, as noted above, if the intake valves are held closed during DFSO operation with the exhaust valves providing compression and/or expansion braking, the intake manifold pressure may increase to atmospheric, on a naturally aspirated engine. Then, post-DFSO, it may be desirable to smoothly transition the intake manifold pressure from atmospheric to the desired post-DFSO intake manifold pressure set point. This transition can be managed by pre-positioning the throttle angle in a manner that will allow the throttle to rapidly achieve the desired post-DFSO intake manifold pressure set point.

Figure 4:
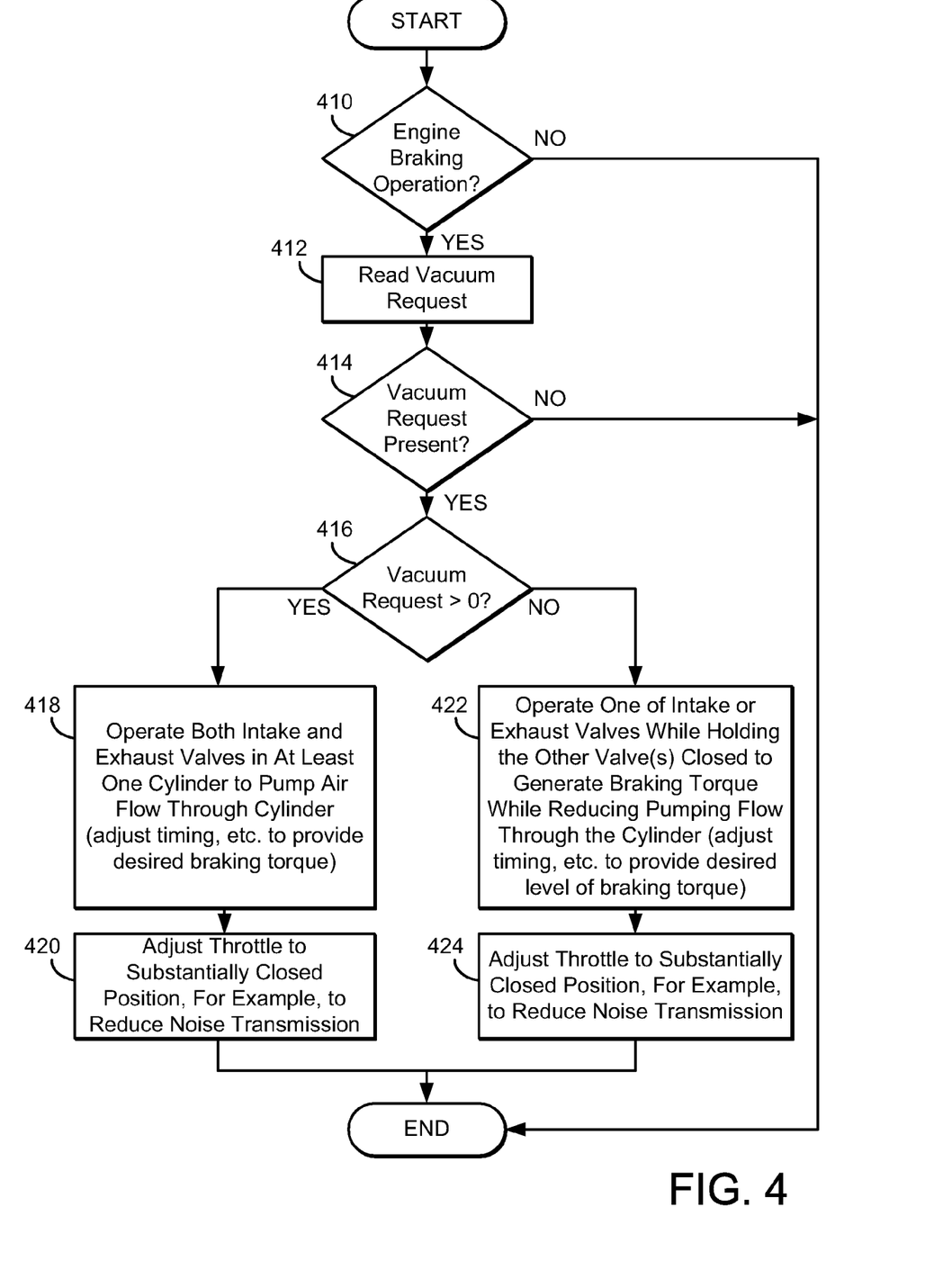
FIG. 4 shows an example high level routine for adjusting engine braking in response to required intake manifold vacuum levels.

Referring now to FIG. 4, a routine is provided for adjusting intake and/or exhaust valve timing, along with throttle position, during vehicle deceleration to vary intake manifold vacuum levels (while still providing the desired level of engine braking).

First, in 410, the routine determines whether engine braking operation is requested or being provided. If so, the routine continues to 412, where the vacuum request is read. The vacuum request may be in response to monitoring of vacuum NVH, brake booster or canister purge pressure, a minimum vacuum level, or various other vacuum requests. Then, in 414, the routine determines whether a vacuum request is present, and in 416 whether the vacuum request is greater than zero (or greater than the current level of vacuum in the intake manifold).

If the answer to 416 is yes, the routine continues to 418 to adjust operation (if not already adjusted) to increase manifold vacuum (decrease manifold pressure) by adjusting operation of one or more cylinders (e.g., all cylinders or a subset thereof) currently operating to generate engine compression and/or expansion braking torque by varying intake and/or exhaust valve opening, closing, or phasing. Further, the routine may adjust the opening/closing timing and/or phase of the intake and/or exhaust valves in response to the desired braking torque as noted above herein.

In one example, the routine may adjust operation to increase a number of cylinders with both intake and exhaust valves operating during a cycle. As such, the valve timings of one or more cylinders currently generating expansion and/or compression braking (by holding an intake valve closed and opening, closing, and opening an exhaust valve) may be adjusted so that both intake and exhaust valves are operated to continue to generate the desired engine braking torque, while also increasing airflow through the engine. The number of cylinders adjusted may be varied depending on the vacuum level requested, vehicle operating conditions, and/or various other parameters. FIG. 6 shows example operation for a cylinder with both the intake and exhaust valve operating.

Then, in 420, the throttle may be adjusted or held in a specified position to generate an increase of vacuum via the increased airflow. Such operation may continue while the vacuum is requested, and then return once the vacuum request has been satisfied. In this way, airflow through the engine may be kept to low levels, while still providing desired braking torque and desired vacuum operation.

Alternatively, if the answer to 416 is no, the routine continues to 422 to adjust operation (if not already adjusted) on one or more cylinders (e.g., all or a subset) to provide the desired engine braking torque via opening/closing of one of the intake or exhaust valve while holding the other valve closed. Further, the routine may adjust the opening/closing timing and/or phase of the operating valves in response to the desired braking torque as noted above herein. In this way, airflow through the engine may be reduced. Then, in 424, the throttle may be adjusted to the substantially closed position to reduce noise transmission of valve operation through the intake system. The number of cylinders adjusted may be varied depending on the vacuum level requested, vehicle operating conditions, and/or various other parameters. FIG. 5 shows example operation for a cylinder with the intake valve held closed and the exhaust valve operating.

FIGS. 5A-5D are timing diagrams showing example valve operations that may be applied to a deactivated cylinder (e.g. undergoing DFSO) to achieve a desired braking torque. In particular, FIGS. 5A-5D show valve operations that may be used to reduce or inhibit air flow through the deactivated cylinder, as may be performed during a condition where a vacuum level increase is not requested, for example. The horizontal axis of the timing diagrams represents time as the position of the piston as it moves between a top-dead-center (TDC) position and a bottom-dead-center (BDC) position. The vertical axis of the timing diagrams represents the position of the intake valves and exhaust valves as being in either an opened position denoted as "O" or a closed position denoted as "C".

Figure 5A:
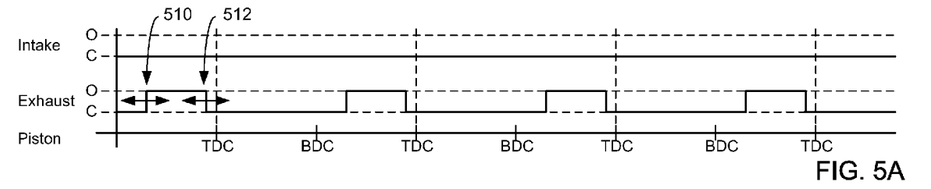
FIGS. 5 and 6 show example timing diagrams.

In the example shown in FIG. 5A, each of the intake valves of the deactivated cylinder may be held closed while one or more of the exhaust valves may be opened before TDC and closed before, at, or after TDC to provide the desired expansion braking. For example, the timing of an exhaust valve opening event shown at 510 may be advanced or retarded as desired via the EVA system. Similarly, the timing of an exhaust valve closing event shown at 512 may be advanced or retarded over time as desired to achieve the desired braking torque. As one example, the exhaust valves may be operated so that they are held closed around TDC so that less braking is provided. As a greater level of braking is requested, the exhaust valve may be opened around TDC to rapidly release the compressed air, thereby reducing the force provided to the piston during the subsequent expansion stroke and increasing the expansion braking.

Figure 5B:
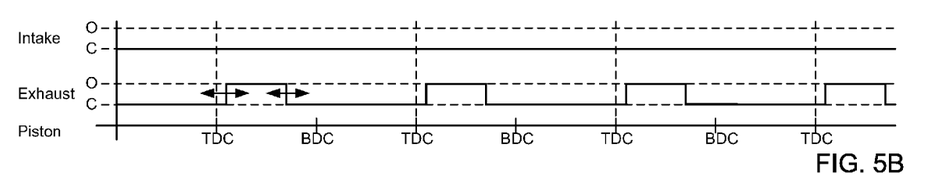

Similarly, FIG. 5B shows an operation where the intake valve or valves may be held closed while one or more of the exhaust valves may opened at or after TDC to provide compression breaking. As described above with reference to FIG. 5A, the timing of the opening and/or closing of the exhaust valve may be varied with time to achieve the desired braking torque. In this manner, compression and expansion braking may be performed by the exhaust valve(s) as shown respectively in FIGS. 5A and 5B, while the intake valve(s) are held closed to inhibit air flow through the cylinder.

Figure 5C:
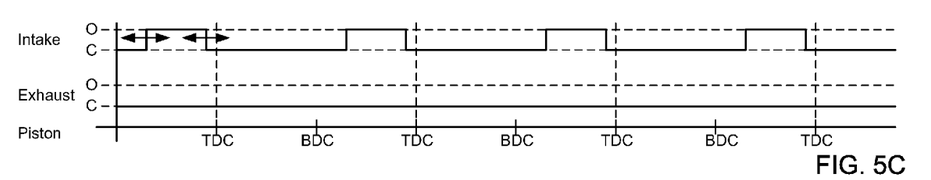
Figure 5D:
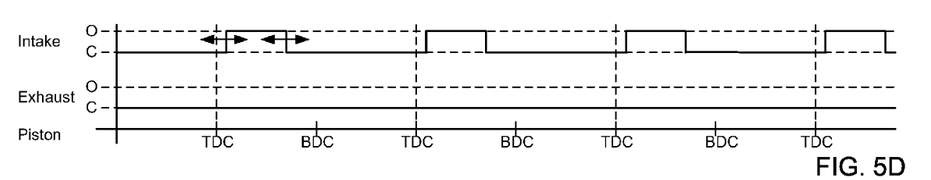

Similarly, the intake valve(s) may be operated to achieve the desired expansion braking as shown in FIG. 5C and/or compression braking as shown in FIG. 5D, while the exhaust valve(s) are held closed to inhibit air flow through the cylinder. Still other approaches are possible. For example, a combination of expansion and/or compression braking may be performed by the intake and/or exhaust valves, wherein the valves on the intake side or the exhaust side of the cylinder are held closed to reduce air flow through the cylinder while the other valves are operated to achieve the desired braking torque. As one example, one or more cycles of expansion braking may be performed by the intake valves followed by one or more cycles of compression braking performed by the exhaust valves. It should be appreciated that the above control strategies are non-limiting examples and that other combinations of expansion and compression braking may be used with other combinations of intake and exhaust valve operation.

Figure 6A:
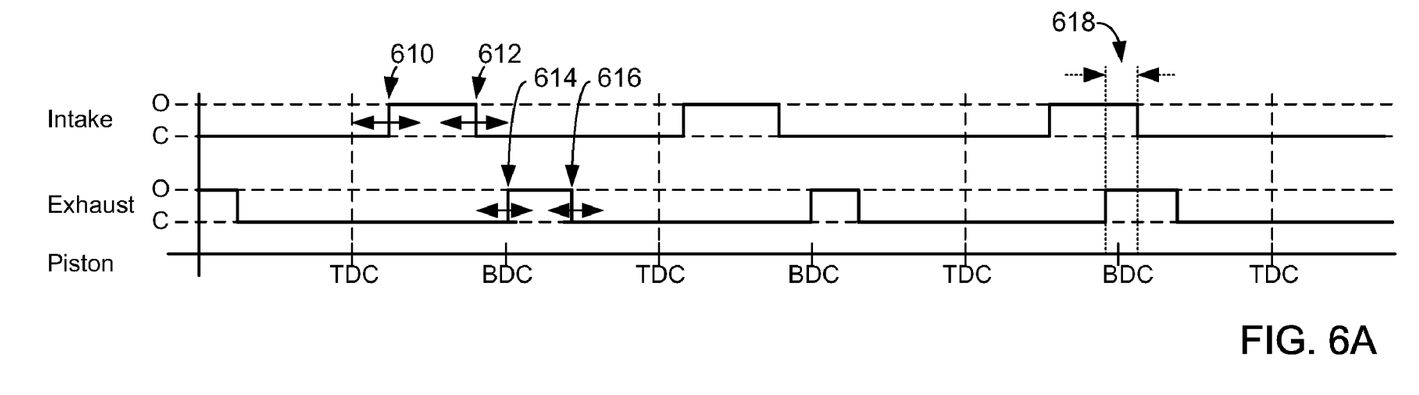
Figure 6B:
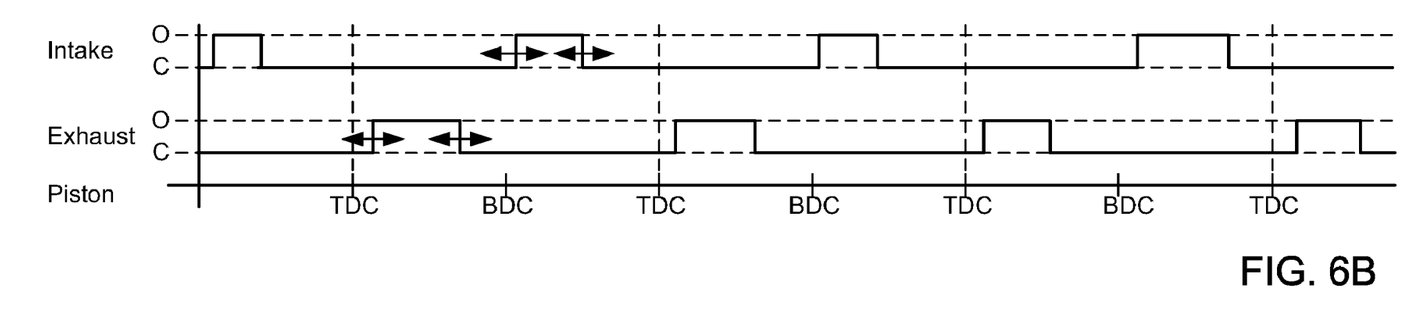

In each of the above examples provided above with reference to FIGS. 5A-5D, one of the intake valves and exhaust valves are held closed or are held substantially closed to reduce airflow between the intake manifold and exhaust manifold via the cylinder during a braking operation. FIGS. 6A and 6B provide examples of how expansion and/or compression braking may be performed while enabling at least some air flow through the cylinder during a DFSO operation. In this example, at least one of the intake valves and at least one of the exhaust valves of a deactivated cylinder may be opened, enabling air to flow from the intake manifold to the exhaust manifold via the cylinder. The increase of flow through the engine may be used to achieve a greater intake manifold vacuum level or to maintain a particular vacuum level. Further, in some conditions, the intake throttle may be reduced (i.e. positioned to decrease the effective flow area) while the air flow through the cylinder is increased via valve actuation to further increase the intake manifold vacuum level. In this manner, sufficient vacuum to operate other vehicle systems may be provided during a DFSO event being performed by one or more cylinders.

In the example shown in FIG. 6A, the intake valves are operated to provide expansion braking and the exhaust valves are operated to provide compression braking, thereby enabling at least some flow of air through the cylinder. FIG. 6A shows how the timing of an opening event and a closing event of an intake valve may be advanced and/or retarded at 610 and 612 to vary the amount of braking torque. Similarly, the timing of an opening event and a closing event of an exhaust valve may be advanced and/or retarded as shown at 614 and 616 to achieve the desired braking torque. As described above, in some conditions, the amount of braking torque may be increased by increasing the amount of air allowed to flow out of the cylinder during a compression stroke in the case of compression braking and by increasing the amount of air allowed to flow into the cylinder during an expansion stroke in the case of expansion braking. In some conditions, the valves may be controlled so that there is overlap between an opening event of at least one intake valve and one exhaust valve as shown at 618.

FIG. 6B shows an example where the intake valve is operated to provide compression braking and the exhaust valve is operated to provide expansion braking. Further, as described above with reference to FIG. 6A, the timing of an opening and/or closing event may be varied for the intake and/or exhaust valves to provide the desired level of braking torque and/or to control the flow of air through the cylinder.

In some embodiments, the valve control operations described above with reference to FIGS. 5 and 6 may be selectively performed to achieve the desired braking torque and intake manifold vacuum level. For example, a deactivated cylinder may be operated to provide compression and/or expansion braking by holding one of intake/exhaust valves closed while opening, closing, and opening the other of the intake/exhaust valves, at least during a first vacuum level of the intake manifold. During a second vacuum level, the cylinder may be operated to provide compression and/or expansion braking by operating both the intake and exhaust valves to allow at least some air flow and/or a greater air flow through the cylinder. The intake throttle may also be adjusted to vary the vacuum level. For example, where air is permitted to flow through the cylinder during a first operating condition and a greater intake manifold vacuum is desired, the intake and/or exhaust valves may be operated to increase the air flow through the cylinder and/or the throttle may be reduced. Further, during each of the above valve control operations, the intake and/or exhaust valve timing may be varied in response to the vehicle operating conditions and/or an operator request (e.g. requested braking).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of operating an engine having at least one cylinder and an intake manifold for directing air to the cylinder, comprising:
    discontinuing combustion in the cylinder for at least one cycle by temporarily halting delivery of fuel to the cylinder;
    during a first condition after combustion is discontinued, operating the cylinder to provide at least one of compression braking and expansion braking by holding one of an intake valve and an exhaust valve closed while opening, closing, and opening the other of said intake valve and said exhaust valve;
    during a second condition after combustion is discontinued, wherein said second condition includes a request to increase the vacuum level within the intake manifold, varying an operation of at least one of the intake valve and the exhaust valve to increase air flow through the cylinder, and subsequently varying an operation of at least one of the intake valve and the exhaust valve to reduce air flow through the cylinder when the request is satisfied; and
    resuming combustion in the cylinder by re-initiating delivery of fuel to the cylinder, wherein the amount of fuel delivered to the cylinder during a number of cycles after resuming combustion is based on an amount of oxygen provided to the exhaust during said discontinued combustion operation.

2. The method of claim 1, wherein said amount of oxygen provided to the exhaust includes an amount of oxygen provided to an aftertreatment device arranged in an exhaust passage downstream of the cylinder.

3. A method of operating an engine for a vehicle having at least a first cylinder, the method comprising:
    operating the first cylinder to provide at least one of compression braking and expansion braking by holding one of an intake valve and an exhaust valve of the first cylinder closed while opening, closing, and opening the other of the intake valve and the exhaust valve during a cycle of the first cylinder and during a first vacuum level of an intake manifold upstream of the first cylinder; and
    operating the first cylinder to provide at least one of compression braking and expansion braking by operating both the intake valve and the exhaust valve of the first cylinder during a cycle of the first cylinder to allow at least some air to flow through the first cylinder during a second vacuum level of the intake manifold.

4. The method of claim 3, wherein the first and the second vacuum levels are requested vacuum levels in response to at least one of a noise, vibration, canister purge, brake booster vacuum, and an operator brake pedal actuation.

5. The method of claim 3 further comprising, varying an amount of fuel delivered to the first cylinder during the first vacuum level in response to an amount of oxygen provided to an exhaust passage downstream of the first cylinder during the second vacuum level.

6. The method of claim 3 further comprising, during the first vacuum level, adjusting a timing of at least one of said opening, closing, and opening of the other valve to vary the compression braking or expansion braking provided by the first cylinder.

7. The method of claim 6, wherein the timing is adjusted in response to operating conditions of the vehicle.

8. The method of claim 6, wherein the timing is adjusted in response to an operator request.

9. The method of claim 3 further comprising, during the second vacuum level, adjusting a timing of at least one of an opening event and a closing event of at least one of the intake valve and the exhaust valve to vary the compression braking or expansion braking provided by the first cylinder.

10. The method of claim 9, wherein the timing is adjusted in response to operating conditions of the vehicle.

11. The method of claim 9, wherein the timing is adjusted in response to an operator request.

12. The method of claim 3, wherein the engine includes at least a second cylinder and wherein the method further comprises:
    operating the second cylinder to provide at least one of compression braking and expansion braking by holding one of an intake valve and an exhaust valve of the second cylinder closed while opening, closing, and opening the other of the intake valve and the exhaust valve during a cycle of the second cylinder and during a third vacuum level of the intake manifold; and
    operating the second cylinder to provide at least one of compression braking and expansion braking by operating both the intake valve and the exhaust valve of the second cylinder during a cycle of the second cylinder to allow at least some air to flow through the second cylinder during a fourth vacuum level of the intake manifold.

13. The method of claim 12, wherein the first vacuum level is equal to the third vacuum level and wherein the second vacuum level is greater than the fourth vacuum level.

14. The method of claim 12, wherein the first vacuum level is equal to the third vacuum level and wherein the second vacuum level is equal to the fourth vacuum level.

15. A method of operating an engine having a plurality of cylinders, comprising:
    during an increased vacuum level request, increasing a vacuum level of an intake manifold by increasing a number of cylinders providing at least one of compression braking and expansion braking by operating at least one intake valve and at least one exhaust valve to allow at least some air to flow through the first cylinder in response to reduced vacuum; and
    during a decreased vacuum level request, decreasing the vacuum level and decreasing air flow through the engine by increasing a number of cylinders providing at least one of compression braking and expansion braking by holding closed one of an intake valve and an exhaust valve while opening, closing, and opening the other of the intake valve and the exhaust valve in response to increased vacuum.

16. The method of claim 15, wherein the increased and decreased vacuum level requests are in response to at least one of noise, vibration, canister purge, brake booster vacuum and an operator brake pedal actuation.

17. The method of claim 15, wherein a throttle arranged upstream of the intake manifold is varied to decrease an effective flow area during the increased vacuum level request and is varied to increase the effective flow area during the decreased vacuum level request.

18. The method of claim 15 further comprising, adjusting a timing of at least one of an opening event and a closing event of at least one of the intake valve and the exhaust valve to vary the compression braking or expansion braking provided by the cylinder.

19. The method of claim 18, wherein the timing is adjusted in response to operating conditions of the vehicle.

20. The method of claim 18, wherein the timing is adjusted in response to an operator request.

* * * * *